United States Patent
Lucas et al.

(10) Patent No.: US 11,122,421 B2
(45) Date of Patent: Sep. 14, 2021

(54) LOADING OF A NEW SUBSCRIPTION PROFILE INTO AN EMBEDDED SUBSCRIBER IDENTIFICATION MODULE

(71) Applicant: Orange, Paris (FR)

(72) Inventors: Philippe Lucas, Châtillon (FR); Christine Lemoine, Châtillon (FR)

(73) Assignee: Orange, Paris (FR)

( * ) Notice: Subject to any disclaimer, the term of this patent is extended or adjusted under 35 U.S.C. 154(b) by 0 days.

(21) Appl. No.: 16/631,819

(22) PCT Filed: Jul. 13, 2018

(86) PCT No.: PCT/FR2018/051780
§ 371 (c)(1),
(2) Date: Jan. 16, 2020

(87) PCT Pub. No.: WO2019/016450
PCT Pub. Date: Jan. 24, 2019

(65) Prior Publication Data
US 2020/0169870 A1    May 28, 2020

(30) Foreign Application Priority Data
Jul. 19, 2017 (FR) ..................... 1756854

(51) Int. Cl.
*G06F 21/62* (2013.01)
*H04L 29/06* (2006.01)
(Continued)

(52) U.S. Cl.
CPC ........... *H04W 8/205* (2013.01); *H04W 8/183* (2013.01); *H04W 8/265* (2013.01); *H04W 12/06* (2013.01)

(58) Field of Classification Search
None
See application file for complete search history.

(56) References Cited

U.S. PATENT DOCUMENTS

| | | | |
|---|---|---|---|
| 2012/0117635 A1 | 5/2012 | Schell et al. | |
| 2012/0190354 A1* | 7/2012 | Merrien | H04B 1/3816 |
| | | | 455/422.1 |

(Continued)

FOREIGN PATENT DOCUMENTS

| | | |
|---|---|---|
| EP | 2 747 466 A1 | 6/2014 |
| WO | WO 2016/185129 A1 | 11/2016 |

OTHER PUBLICATIONS

International Search Report and Written Opinion dated Dec. 3, 2018 for Application No. PCT/FR2018/051780.
(Continued)

*Primary Examiner* — Gary Lafontant
(74) *Attorney, Agent, or Firm* — Knobbe, Martens, Olson & Bear, LLP

(57) ABSTRACT

A method of loading a subscription profile into a subscriber identification module of a target mobile terminal is described. The method can include sending a combined request for authentication and transfer of profile to an authentication system, the request containing a user identifier of the target mobile terminal and receiving in return a response message containing an activation code. The method can also include sending a request for downloading the subscription profile to a provisioning equipment item, the downloading request comprising the activation code, and, subsequent to a positive verification of the activation code by the provisioning equipment item, downloading the subscription profile into the subscriber identification module of the target mobile terminal.

12 Claims, 2 Drawing Sheets

(51) Int. Cl.
*H04W 8/20* (2009.01)
*H04W 8/18* (2009.01)
*H04W 8/26* (2009.01)
*H04W 12/06* (2021.01)

(56) References Cited

U.S. PATENT DOCUMENTS

2014/0073292 A1 3/2014 Kim et al.
2016/0316372 A1* 10/2016 Daksiewicz ............ H04W 4/50

OTHER PUBLICATIONS

"Smart Cards; Embedded UICC; Requirements Specification (Release 13)", Technical Specification, European Telecommunications Standards Institute (ETSI), 650, Route Des Lucioles ; F-06921 Sophia-Antipolis ; France, vol. SCP REQ, No. V13.2.0, May 1, 2016 (May 1, 2016), XP014275091, paragraphs 4 et 5.

* cited by examiner

LOADING OF A NEW SUBSCRIPTION PROFILE INTO AN EMBEDDED SUBSCRIBER IDENTIFICATION MODULE

RELATED APPLICATIONS

This application is the U.S. National Phase of Application No. PCT/FR2018/051780 entitled "LOADING OF A NEW SUBSCRIPTION PROFILE INTO AN EMBEDDED SUBSCRIBER IDENTIFICATION MODULE" and filed Jul. 13, 2018, which claims the benefit of French Patent Application No. 1756854, filed Jul. 19, 2017, each of which is incorporated by reference in its entirety.

The present invention relates to the field of mobile telecommunications, and more particularly that of mobile equipment items in which a subscriber identification module of embedded SIM card type is incorporated.

Since the first generations of cellphones, it is standard practice for a user to have to insert a chip, called SIM card, into his or her cellphone. This SIM card is supplied physically to the user by the operator of a mobile telecommunications network to which he or she subscribes. When it is supplied to the user, this SIM card already contains in memory a subscription profile comprising elements allowing this user to be authenticated with this network in order to access the services that it offers, based on the subscription taken out. Thus, by virtue of the physical separation between, on the one hand, the cellphone and, on the other hand, the SIM card, the user can easily change terminal while retaining his or her SIM card, and thus remain with the same operator, or, conversely, change operator, and therefore SIM card, while retaining his or her terminal.

For a few years, however, there have been more and more mobile terminals (whether telephones or tablets) in which the SIM card is integrated (that is to say not physically separable from the terminal), in which case the term embedded SIM card applies, or eSIM. This type of technology was first employed for the M2M ("machine-to-machine") terminals before being used in the so-called "secondary" terminals (connected watches, for example), that can be configured via a so-called "primary" terminal, such as a smartphone.

In the case of a "primary" terminal, of smartphone or tablet type, in which an embedded eSIM module is integrated, it is necessary to remotely download the secret data of the mobile operator to which the user has subscribed, in order to allow secure access to the network of that mobile operator. These secret data are usually referred to by the term subscription profile and corresponding to a subscription of a user to the mobile operator.

As an illustration of such a download, the patent application US 2012/0117635 A1 describes a device in which a "false" SIM card is provided, the latter not containing in itself information of SIM type, but allowing the downloading of information of eSIM type from an eSIM server to emulation software installed in an integrated circuit of UICC type. For this, an activation code is printed beforehand, statically and definitively, in the UICC integrated circuit so as to be able to allow a user re-entering this activation code to access the network and to download the appropriate eSIM data.

Another example of profile downloading is illustrated by the patent application US 2014/0073292 A1 describing a profile transfer system between two terminals, in which a user profile request is transmitted from a target terminal to a management server, user identification information being transmitted in order to authenticate the user associated with this profile request. The management server then interacts with another server in order to obtain the profile installed on a source terminal in order for the latter to be downloaded onto the target terminal.

Finally, the patent application EP 2 747 466 A1 describes a method for obtaining a secure element in a mobile terminal with subscription profile, from a server of the network.

In order to recover such a subscription profile, the terminal with an embedded eSIM module must obtain the address of the server on which this subscription profile is located, as well as a reference making it possible to recover this subscription profile from this server during a preliminary pre-configuration. Now, in a context in which the client wants to use his or her subscription on a new terminal, that can prove fairly tedious, the user having to choose the operator to inform it of the use of a new terminal with an embedded eSIM module, then perform complex operations before being able to obtain this address and this profile reference, and proceed with the downloading of the subscription profile into the eSIM module of his or her mobile terminal.

The object of the present invention is to remedy the abovementioned drawbacks in terms of initialization of mobile terminals with embedded eSIM modules, in the case of a user already having a mobile terminal with SIM card with the same operator.

To this end, it proposes a method for downloading, into a subscriber identification module of a first mobile terminal, called target mobile terminal, a subscription profile, the method comprising the following steps:

sending, by the target mobile terminal, of a combined authentication and profile transfer request to an authentication system, said request containing a user identifier of the target mobile terminal;

reception in return, by the target mobile terminal, of a response message containing an activation code;

sending, by the target mobile terminal, of a request to download the subscription profile to a provisioning equipment item, said download request comprising the activation code; and following a positive verification of the activation code by the provisioning equipment item, downloading of the subscription profile into the subscriber identification module of the target mobile terminal.

In a particularly advantageous embodiment, this method also comprises the following steps, following the reception of the combined authentication and profile transfer request by the authentication system:

sending, by the authentication system, of a user authentication request to a subscriber identification module of a second mobile terminal, called source mobile terminal;

authentication of the user by the subscriber identification module of the source mobile terminal; and when the result of said authentication by the subscriber identification module of the source mobile terminal is positive, preparation of the subscription profile by the provisioning equipment item.

Advantageously, this method can also comprise the following steps, when the result of the authentication by the subscriber identification module of the source mobile terminal is positive:

sending, by the source mobile terminal, of a positive authentication response to the authentication system; and sending, by the authentication system, of a profile preparation request to a control processing equipment item, in order to trigger the preparation of the subscription profile by the provisioning equipment item.

Advantageously, the method comprises, following the positive authentication by the subscriber identification module of the source mobile terminal, the sending by a control processing equipment item of a profile preparation request to the provisioning equipment item, triggering the preparation of the subscription profile by the provisioning equipment item.

In one embodiment, the method also comprises, following the positive authentication by the subscriber identification module of the source mobile terminal, the generation of the activation code by the control processing equipment item and the insertion of said code into the profile preparation collection.

In another embodiment, the method also comprises, following the reception of the profile preparation request by the provisioning equipment item, the generation of the activation code by the provisioning equipment item and the sending, to the control processing equipment item, of a message containing said activation code.

Advantageously, the combined authentication and profile transfer request also contains a unique identifier of the subscriber identification module of the target mobile terminal, said unique identifier being stored in association with the subscription profile by the provisioning equipment item, and the method also comprises the verification of a match between the unique identifier stored in association with the subscription profile by the provisioning equipment item and a unique subscriber identification module identifier inserted into the download request.

It also proposes a mobile terminal comprising a subscriber identification module and a processing module capable of installing a subscription profile in the subscriber identification module, characterized in that the processing module is configured to:

send a combined authentication and profile transfer request to an authentication system (30), said request comprising a user identifier of the mobile terminal;

receive in return a response message containing an activation code;

send a request to download the subscription profile to a provisioning equipment item of the network, said download request containing the activation code; and receive in return the subscription profile.

It also proposes an authentication system for downloading a subscription profile into a subscriber identification module of a first mobile terminal (10), called target mobile terminal, comprising:

a first authentication network equipment item capable of receiving a combined authentication and profile transfer request originating from the target mobile terminal, containing a user identifier of the target mobile terminal;

a second authentication network equipment item capable of receiving an authentication request from the first authentication network equipment item containing the user identifier of the source mobile terminal and configured to transmit an authentication request to the source mobile terminal by means of the user identifier of the source mobile terminal, in order to trigger the preparation of the subscription profile to be downloaded into the subscriber identification module.

It also proposes a system for downloading, into a subscriber identification module of a first mobile terminal, called target mobile terminal, a subscription profile, the downloading system comprising the above authentication system, a provisioning equipment item for storing the subscription profile and a control processing equipment item for instructing the provisioning equipment item to prepare the subscription profile following the reception of a profile preparation request received from the authentication system.

It also proposes a computer program comprising code instructions for implementing at least one of the steps of the above method, as well as a storage medium, that can be read by a mobile terminal or a server, in which is stored the above computer program.

This program can use any programming language, and be in the form of source code, object code, or of intermediate code between source code and object code, such as in a partially compiled form, or in any other desirable form. The information medium can be any entity or device capable of storing the program. For example, the medium can comprise a storage means, such as a ROM, for example a CD ROM or a microelectronic circuit ROM, or even a magnetic storage means, for example a diskette (floppy disk) or a hard disk. Also, the information medium can be a transmissible medium such as an electrical or optical signal, which can be routed via an electrical or optical cable, by radio or by other means. The program according to the invention can in particular be downloaded over a network of Internet type. Alternatively, the information medium can be an integrated circuit in which the program is incorporated, the circuit being adapted to execute or to be used in the execution of the method concerned.

Other features and advantages of the invention will become apparent on reading the following detailed description of particular embodiments, given as nonlimiting examples, and the attached figures in which:

FIG. 3 illustrates a mobile terminal according to an embodiment of the invention.

Figure 1:
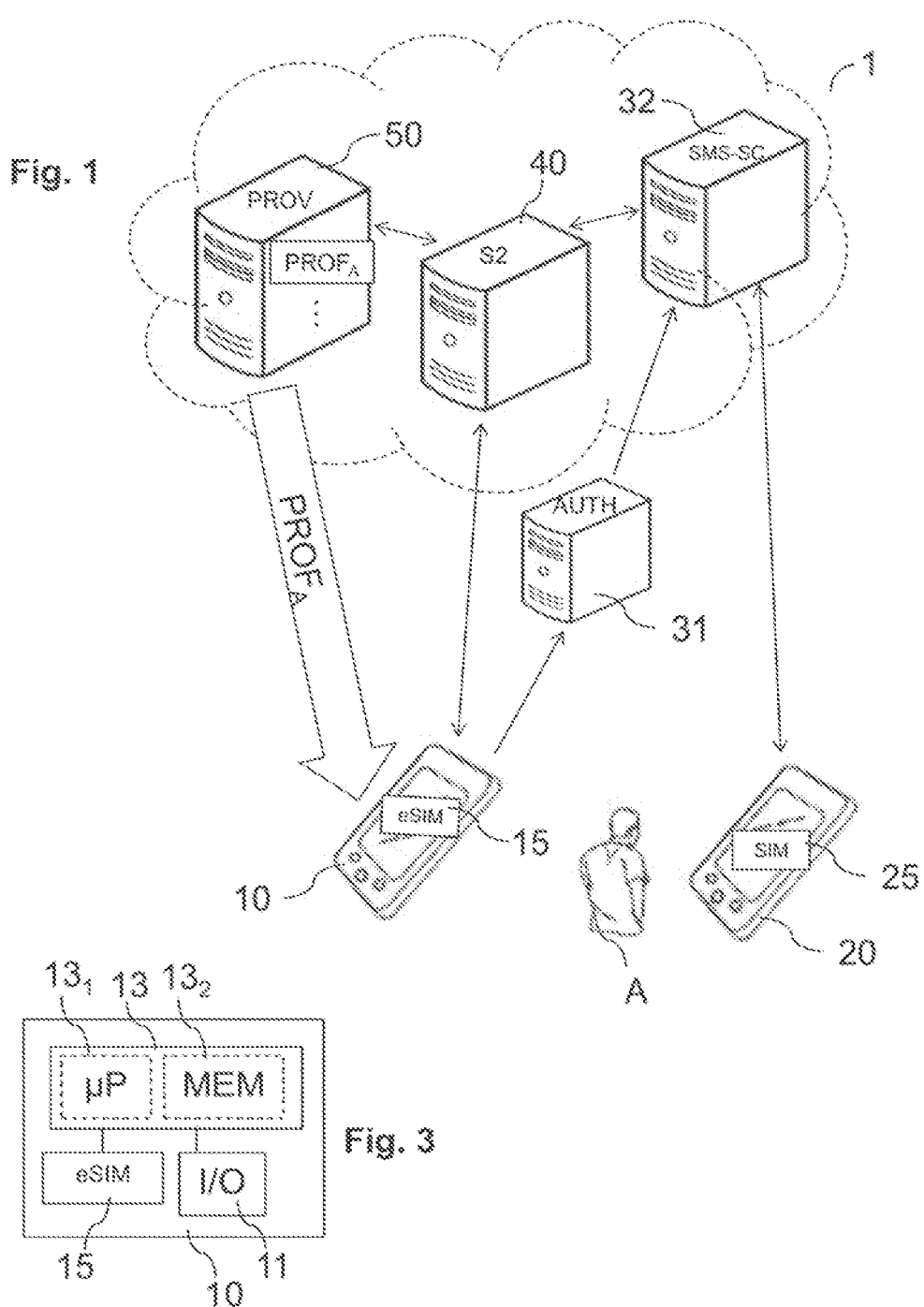
FIG. 1 is a block diagram illustrating a mobile telecommunications system allowing the downloading, into a module of a mobile terminal, of a subscription profile with a telecommunications operator.

Reference is made first of all to FIG. 1 in which a mobile telecommunications system is illustrated that allows the installation, in an embedded subscriber identification module of a mobile terminal, of a subscription profile with a telecommunications operator.

In this system, there is provided, on the one hand, a first mobile terminal 10 (that can equally be a cellphone, a smartphone, a tablet or a portable computer, by way of example), called target mobile terminal, comprising in particular a subscriber identification module 15 (typically formed by a chip containing a microcontroller associated with a memory) installed in the terminal 10 and intended to store a subscription profile comprising information relating to a subscriber A of a mobile network 1. Such a module 15 can typically be implemented in the form of an embedded module, integrated permanently in the mobile 10 and inseparable therefrom, and usually designated by the term "embedded SIM" or "eUICC". Hereinbelow, it will therefore be considered that this module 15 is an embedded module of eSIM type. However, alternatively, this module 15 can also be an extractable eUICC module.

On the other hand, there is provided a second mobile terminal 20 (that can equally be a cellphone, a smartphone, a tablet or a portable computer, by way of example), called source mobile terminal, comprising a subscriber identification module 25 already storing a subscription profile of the subscriber A of the mobile network, comprising information relating to the subscriber A to the mobile network 1. This information can in particular be the identifiers of this subscriber A (for example his or her IMSI number) and of the mobile telecommunications operator OP to which he or she has subscribed (for example the MCC and MNC numbers of the operator OP).

The subscriber identification module 25 is typically a removable module of SIM card type. However, it is also possible to envisage the case where this module 25 is an embedded module of eSIM type.

Moreover, the system 1 comprises a certain number of network equipment items 31,32,40,50 allowing the loading, into the embedded module 15 integrated in the terminal 10, of a subscription profile $PROF_A$ obtained from the already existing subscription profile, stored in the module 25 of the source mobile terminal 20, corresponding to a subscription taken out by the subscriber A with his or her mobile operator OP.

In particular, there is provided, on the one hand, a first network equipment item 50 used to provision subscription profiles, typically implemented in the form of a provisioning server, in which are stored the subscription profiles of the subscribers to one and the same operator, and in particular here the profile $PROF_A$ of the subscriber A, once the latter is prepared.

The subscription profile $PROF_A$ takes the form of a digital file that can comprise in particular the authentication elements of the subscriber with respect to the operator OP (secret key(s) associated with this specific subscription), the identifier(s) of the subscriber (for example IMSI), as well as the services to which the subscriber A has subscribed, with the operator OP or with a third-party service provider. When it has the address of this network equipment item 50, the terminal 10 can download the profile $PROF_A$ from this provisioning equipment item 50, by sending a request to this end to the network address of this equipment item 50.

Also, an authentication system is provided, composed of a first authentication network equipment item 31, capable of receiving requests originating from the target mobile terminal 10, and a second authentication network equipment item 32, capable of sending authentication requests to the source mobile terminal 20.

The first authentication network equipment item 31, typically implemented in the form of an authentication server, is thus provided to receive a combined authentication and subscription profile creation request sent by the terminal 10. This network equipment item 31 is not necessarily managed by the operator of the network 1 and can, on the contrary, be advantageously managed by a third-party to this network operator, in which case the network equipment item 30 is capable of retransmitting any request received from a mobile terminal to a network equipment item of an operator identified by means of a user identifier inserted into this request.

Advantageously, this authentication serve can be a server implementing the GSMA-standardized "Mobile Connect" authentication mechanism, normally used to authenticate a user when he or she accesses services or Internet sites, here re-used not only to authenticate the user but also to trigger the installation of a subscription profile in the embedded identification module 15 of the mobile terminal 10.

The second authentication network equipment item 32 is, for its part, capable of relaying an authentication request to the mobile terminal 20, following the reception of a request originating from the first equipment item 31. This network equipment item 32 is typically implemented in the form of a server, for example an SMS-SC server, in which case the authentication request transmitted to the terminal 20 can be implemented in the form of a command SMS, invisible to the user of the terminal 20, that can be interpreted by the subscriber identification module 25 of the source mobile terminal 20.

Also provided is another network equipment item 40, called control processing equipment item, typically implemented in the form of a server and capable of interacting with the two network equipment items 32 and 40 to prepare the subscription profile to be downloaded into the terminal 10, as well as with the terminal 10 to provide it with information intended to allow this downloading.

Figure 2:
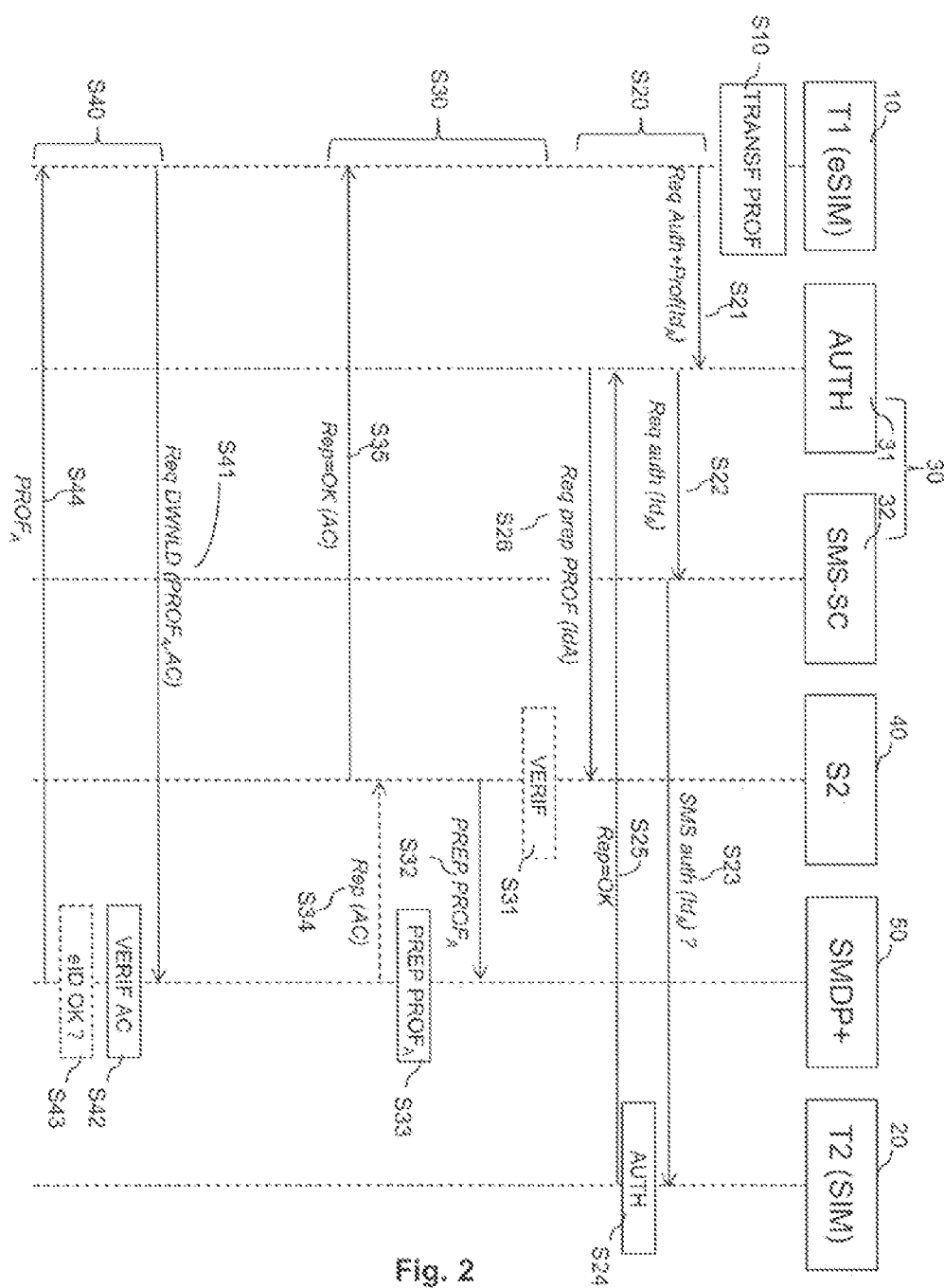
FIG. 2 illustrates the steps of a method for downloading a subscription profile into the subscriber identification module of a mobile terminal, according to an embodiment of the invention.

Reference is now made to FIG. 2 in which a subscription profile loading method according to a first embodiment of the invention is illustrated.

In this method, a user A has previously taken out a subscription with a mobile operator OP, in order to allow him or her to access services offered by this operator by means of a first mobile terminal 20. He or she therefore has a subscription profile stored in the subscriber identification module 25 (here, a SIM card as an illustration), as well as in a network equipment item of the operator (for example an HLR).

Also having a second mobile terminal 10 with identification module 15 (here an embedded module of eSIM type, by way of illustration), this user A wants to create a new subscription profile $PROF_A$ to be downloaded into this embedded module 15.

To do this, the mobile terminal 10 first establishes a connection with the Internet network, for example through a WiFi connection to an access point, a Bluetooth connection to another device having its own Internet access, even by using a so-called "Bootstrap" cellular connection.

Once the connection to the Internet from the terminal 10 is established, the user A can trigger the process of installation of the subscription profile in the embedded module 15 by means of his or her mobile terminal 10 (step S10), for example by means of a menu offering a subscription transfer or extension option, from an initial SIM or eSIM subscription to a target eSIM subscription, or making it possible to connect to the client account of the user by means of an identifier/password pairing or even by means of the "Mobile Connect" authentication solution.

Following the triggering of this process of installation by the user A, a first authentication phase is triggered (phase S20).

During this authentication phase, the terminal 10 transmits to the authentication system 30 a combined authentication and new profile creation request (step S21) containing in particular an identifier $Id_A$ of the user A, typically his or her telephone number. Advantageously, this request can also contain a unique identifier of the embedded identification module 15, for example an identifier of "eID" (for "eUICC identifier") type as defined in the GSMA.

In the embodiment illustrated here, this authentication system 30 comprises a first authentication equipment item 31, capable of receiving combined authentication and new profile creation requests originating from a target mobile terminal such as the terminal 10, associated with a second authentication equipment item 32, capable of transmitting authentication requests to a source mobile terminal, such as the terminal 20. Such an authentication system can in particular be based on the GSMA-standardized "Mobile Connect" mechanism, in which case the equipment item 31 is an equipment item managed by a third party to the operator of the network and the equipment item 32 is an SMS-SC server of the network of this operator.

In such a case, following the reception of this request by the authentication equipment item 31, this equipment item deduces, from the identifier $Id_A$ of the user A, the address of the authentication equipment item 32 of the network to which the user A is a subscriber and transmits an authentication request containing this identifier $Id_A$ to this authentication equipment item 32, here implemented in the form of an SMS-SC server (step S22).

After having received such a request, the SMS-SC server transmits an authentication request, here a command SMS, to the terminal 20 (step S23) in order for this subscriber identification module 25 to proceed automatically with the authentication of the user A (step S24), typically by means of the data stored in this module 25 and of the identifier $Id_A$ received.

If the result of this authentication by the module 25 is indeed positive, the terminal 20 returns a positive authentication response message to the authentication system 30 (step S25), here to the first equipment item 31 of such a system, for the latter to instruct a control processing equipment item 40 of the network of the operator to trigger the preparation of the new subscription profile $PROF_A$ intended to be transmitted to the terminal 10 for installation in its embedded module 15.

This positive authentication response message can take the form of a positive authentication response SMS transmitted by the terminal 20 to the SMS-SC server 32, in response to the authentication request. After reception of this response, the SMS-SC server transmits this response to the authentication equipment item 31, for example by converting this response SMS into a positive authentication response message that can be interpreted by the equipment item 31.

This equipment item 31 can then deduce the address of the control processing equipment item 40 and transmit (step S26) a profile preparation request to the control processing equipment item 40, containing the identifier $Id_A$ of the user A, as well as, possibly, the unique identifier of the module 15 (e.g. its eID).

After having received this profile preparation request, the control processing equipment item 40 triggers a phase of preparation of the subscription profile $PROF_A$ and of an activation code AC associated with this profile (phase S30).

To do this, the control processing equipment item 40 can, previously and advantageously, verify (step S31) that the terminal 10 does indeed have the right to request the creation of a new subscription profile. Such a verification can consist in verifying the eligibility to such a service of the user A, even verifying whether his or her identifier $Id_A$ does not form part of a blacklist of identifiers that cannot benefit from such a service.

If this verification proves positive, or in the absence of such verification if this operation is not implemented, the control processing equipment item 40 sends a request for preparation of the subscription profile $PROF_A$ to the provisioning equipment item 50 (step S32), here implemented in the form of an SMDP+ server.

In one embodiment, the equipment item 40 also at this stage generates an activation code AC, to be associated with the subscription profile $PROF_A$ to be generated, and inserts this code into the preparation request before transmitting this request to the provisioning equipment item 50.

In a particularly advantageous case, this activation code AC can contain the address of the provisioning equipment item 50 which prepares and stores the subscription profile $PROF_A$, as well as, possibly, other element such as a matching identifier ("matching ID") and an optional confirmation code.

This preparation request can thus comprise the identifiers of the embedded module 15 (e.g. EID) if they have been received previously, or if they are already known, and/or of the terminal 10 (e.g. its IMEI), even any combination of these identifiers, in order in particular to allow the operator to associate the subscription profile $PROF_A$ prepared specifically for the embedded module 15 with the subscriber A in particular. The provision of the identifier of the embedded module 15 (e.g. EID) makes it possible to prepare the subscription profile for a dedicated embedded module 15, and thus secure the process by allowing the sending of the profile exclusively to the eSIM of this eID.

After having received this request, the provisioning equipment item 50 prepares (step S33) the operator a new subscription profile $PROF_A$. The data of this new profile can be associated with the existing subscription for the user A by the operator with the HLR in which the data of the existing subscription are already stored, for example through the client account or the MSISDN identifying the subscription of the user A.

At this stage, in an embodiment in which the activation code has not already been generated and inserted into the preparation request by the control processing equipment item 40, this activation code AC can be generated by the provisioning equipment item 50 and transmitted to the control processing equipment item 40 (step S34).

Thus, whatever the equipment item having generated this activation code AC, the latter is shared by the equipment items 40 and 50 at the end of these steps S31 to S33.

Once this activation code AC is generated and shared between the equipment items 40 and 50, the new subscription profile $PROF_A$ is stored in memory by the provisioning equipment item 50, in association with the corresponding activation code AC, pending a possible subsequent request for downloading of this profile.

The control processing equipment item 40 then returns (step S35) to the terminal 10 a positive response message, containing the activation code AC as well as the address of the provisioning equipment item 40 where the profile $PROF_A$ is stored (possibly included in the activation code AC).

Once it has received this response message, the terminal 10 can then trigger a phase of downloading of the subscription profile (phase S40).

During this downloading phase, the terminal 10 transmits a download request to the provisioning equipment item 50 (step S41), by means of the address of this equipment item 50 that it has received previously from the equipment item 40, possibly extracted from the activation code AC if it is included in this code, and by using this address to transmit this request.

This download request contains in particular the activation code AC that it has received previously from the control processing equipment item 40, as well as, optionally, the unique identifier of embedded module 15 (e.g. its eID).

The provisioning equipment item 50 can then verify the match between the activation code AC received from the terminal 10 and the activation code AC previously associated with the subscription profile $PROF_A$ that it has in memory (step S42).

Furthermore, when a unique embedded module identifier has been previously associated with the profile $PROF_A$, the provisioning server 50 can also verify the match between this unique identifier previously associated with the profile and a unique embedded module identifier inserted by the terminal 10 into the download request (optional step S43).

When this or these checks prove positive, the provisioning equipment item 50 sends to the terminal 10 the file of the subscription profile PROF$_A$ (step S44), that the terminal 10 can then memorize and install in its embedded identification module 15.

The terminal 10 then has, in its embedded module 15, data necessary to allow its user to access the mobile network and the services to which he or she is a subscriber via this network.

At this stage, the subscriber A has two "primary" terminals 10 and 20 with active subscription profiles allowing him or her to access the mobile network with any one of these terminals, thus being in a so-called "multi-SIM" configuration allowing him or her in particular to keep his or her mobile terminal 20 as a backup of his or her terminal 10.

Alternatively, once the subscription profile PROF$_A$ is installed in the terminal 10, the subscription profile associated with the identification module 25 of the source mobile terminal 20 can be deactivated, either after confirmation by the user, or automatically from an equipment item of the network which sends an instruction to the HLR in which this subscription profile is stored to deactivate it.

Reference is now made to FIG. 3 which illustrates a mobile terminal according to an embodiment of the invention.

This mobile terminal 10 comprises:
- a communication module 11, typically implemented in the form of a radio interface, used to connect the terminal 10 to a mobile communication network, in particular to transmit messages such as the requests described previously, generated by the processing module 13, to the network equipment items 20 to 40 and receive responses from these equipment items to supply them to the module 13 for processing, as well as the profile PROF$_A$ to be loaded in the embedded module 15 below;
- a processing module 13, typically implemented materially by a processor 13$_1$ associated with a memory 13$_2$ (itself composed of a random access memory and a read-only memory, for example), configured to generate the requests described previously, intended to be transmitted to the network equipment items 20 to 40, and to process the responses to these requests received from these equipment items;
- an embedded subscriber identification module 15, typically formed by a chip containing a microcontroller and a memory, integrated in the terminal 10 and intended to store information relating to a subscriber A of a mobile network, such as the identifiers of this subscriber A (i.e. his or her IMSI number) and of the mobile telecommunications operator OP to which he or she has subscribed (for example the MCC and MNC numbers of the operator OP). Such a module 15, inseparable from the terminal 10 unlike a conventional SIM card, is usually designated by the terms "embedded SIM" or "eUICC".

Obviously, the invention is not limited to the exemplary embodiments described above and represented, from which it will be possible to provide other modes and other embodiments, without in any way departing from the scope of the invention defined in the claims.

The invention claimed is:

1. A method for downloading a subscription profile into a subscriber identification module of a target mobile terminal, the method performed by the target mobile terminal comprising:

sending a combined authentication and profile transfer request to an authentication system, the request containing a user identifier of the target mobile terminal;

receiving, by the target mobile terminal, a response message containing an activation code;

sending, by the target mobile terminal, a request to download the subscription profile to a provisioning equipment item, the download request comprising the activation code; and following a positive verification of the activation code by the provisioning equipment item, downloading the subscription profile into the subscriber identification module of the target mobile terminal.

2. The method of claim 1, further comprising, following the reception of the combined authentication and profile transfer request by the authentication system:

sending, by the authentication system, a user authentication request to a subscriber identification module of a source mobile terminal;

authentication of the user by a subscriber identification module of the source mobile terminal; and when the result of said authentication by the subscriber identification module of the source mobile terminal is positive, preparation of the subscription profile by the provisioning equipment item.

3. The method of claim 2, further following the positive authentication by the subscriber identification module of the source mobile terminal:

sending, by the source mobile terminal, a positive authentication response collection to the authentication system; and sending, by the authentication system, a profile preparation request to a control processing equipment item, in order to trigger the preparation of the subscription profile by the provisioning equipment item.

4. The method of claim 3, further comprising, following the reception of the profile preparation request, sending, by the control processing equipment item, a profile preparation request to the provisioning equipment item, triggering the preparation of the subscription profile by the provisioning equipment item.

5. The method of claim 2, further comprising, following the positive authentication by the subscriber identification module of the source mobile terminal, generation of the activation code by the control processing equipment item, and insertion of said activation code into the profile preparation request.

6. The method of claim 2, further comprising, following the reception of the profile preparation request by the provisioning equipment item, generation of the activation code by the provisioning equipment item, and sending, to the control processing equipment item, a response message containing the activation code.

7. The method of claim 1, wherein the combined authentication and profile transfer request also contains a unique identifier of the subscriber identification module of the target mobile terminal, the unique identifier being stored in association with the subscription profile by the provisioning equipment item, and wherein the method further comprises verifying a match between the unique identifier stored in association with the subscription profile by the provisioning equipment item and a unique subscriber identification module identifier inserted into the download request.

8. A mobile terminal comprising a subscriber identification module and a processor capable of installing a subscription profile in the subscriber identification module, wherein the processor is configured to:

send a combined authentication and profile transfer request to an authentication system, the request comprising a user identifier of the mobile terminal;

receive in return a response message containing an activation code;

send a request to download the subscription profile to a provisioning equipment item of the network, the download request containing the activation code; and receive in return the subscription profile.

9. An authentication system for downloading a subscription profile into a subscriber identification module of a target mobile terminal, the system comprising:

a first authentication network equipment item capable of receiving a combined authentication and profile transfer request originating from the target mobile terminal, containing a user identifier of the target mobile terminal; and a second authentication network equipment item capable of receiving an authentication request from the first authentication network equipment item containing the user identifier of the target mobile terminal and configured to transmit an authentication request to the source mobile terminal using the user identifier of the target mobile terminal, in order to trigger the preparation of the subscription profile to be downloaded into the subscriber identification module.

10. A system for downloading, into a subscriber identification module of a target mobile terminal, a subscription profile, the downloading system comprising:

the authentication system of claim 9;

a provisioning equipment item for storing the subscription profile and a control processing equipment item for instructing the provisioning equipment item to prepare the subscription profile following the reception of a profile preparation request received from the authentication system.

11. A computer comprising a processor and a memory, the computer having stored thereon instructions which when executed by the processor, cause the computer to implement the method of claim 1.

12. A non-transitory computer readable storage medium having stored thereon instructions, which when executed by a processor, cause the processor to implement the method of claim 1.

* * * * *